United States Patent
Iwai et al.

(10) Patent No.: US 11,044,711 B2
(45) Date of Patent: Jun. 22, 2021

(54) BASE STATION, TERMINAL, AND COMMUNICATION METHOD

(71) Applicant: Panasonic Intellectual Property Corporation of America, Torrance, CA (US)

(72) Inventors: Takashi Iwai, Ishikawa (JP); Ayako Horiuchi, Kanagawa (JP); Tetsuya Yamamoto, Kanagawa (JP); Tomohumi Takata, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 244 days.

(21) Appl. No.: 16/306,378

(22) PCT Filed: May 19, 2017

(86) PCT No.: PCT/JP2017/018769
§ 371 (c)(1),
(2) Date: Nov. 30, 2018

(87) PCT Pub. No.: WO2017/217182
PCT Pub. Date: Dec. 21, 2017

(65) Prior Publication Data
US 2020/0329459 A1    Oct. 15, 2020

(30) Foreign Application Priority Data
Jun. 16, 2016  (JP) .............................. JP2016-119760

(51) Int. Cl.
*H04W 4/00*    (2018.01)
*H04W 72/04*   (2009.01)
*H04W 72/12*   (2009.01)

(52) U.S. Cl.
CPC ......... *H04W 72/042* (2013.01); *H04W 72/12* (2013.01)

(58) Field of Classification Search
None
See application file for complete search history.

(56) References Cited

U.S. PATENT DOCUMENTS

2013/0089056 A1*  4/2013  Iwai ............... H04L 5/0094
                                                    370/329
2015/0245315 A1   8/2015  Kawasaki
(Continued)

FOREIGN PATENT DOCUMENTS

| JP | 2014-103582 A | 6/2014 |
| JP | 2015-144477 A | 8/2015 |
| WO | 2014/092619 A1 | 6/2014 |
| WO | 2014/199814 A1 | 12/2014 |

OTHER PUBLICATIONS

International Search Report of PCT application No. PCT/JP2017/018769 dated Jul. 11, 2017.
(Continued)

*Primary Examiner* — Clemence S Han
(74) *Attorney, Agent, or Firm* — Seed IP Law Group LLP

(57) ABSTRACT

In a base station, a transmission unit transmits a downlink control signal and downlink data assigned by the downlink control signal in a time unit including a downlink time resource for the downlink control signal, a downlink time resource for the downlink data, and an uplink time resource for a response signal for the downlink data. A reception unit receives the response signal in the time unit. A transmission bandwidth of the response signal is equal to or lower than a transmission bandwidth of the downlink data corresponding to the response signal.

11 Claims, 14 Drawing Sheets

(56) References Cited

U.S. PATENT DOCUMENTS

| | | | |
|---|---|---|---|
| 2016/0143042 A1 | 5/2016 | Nagata et al. | |
| 2016/0157287 A1* | 6/2016 | Chae | H04W 76/14 |
| | | | 370/329 |
| 2017/0208568 A1* | 7/2017 | Nam | H04L 5/0094 |
| 2017/0353947 A1* | 12/2017 | Ang | H04L 5/0048 |
| 2019/0037640 A1* | 1/2019 | Xiong | H04W 88/06 |
| 2019/0090258 A1* | 3/2019 | Ryu | H04B 7/0632 |
| 2019/0268903 A1* | 8/2019 | Lee | H04W 72/0446 |
| 2020/0137751 A1* | 4/2020 | Nam | H04W 74/006 |

OTHER PUBLICATIONS

3GPP TS 36.211 V13.1.0, "3rd Generation Partnership Project; Technical Specification Group Radio Access Network; Evolved Universal Terrestrial Radio Access (E-UTRA); Physical channels and modulation (Release 13)", Mar. 2016.

3GPP TS 36.212 V13.1.0, "3rd Generation Partnership Project; Technical Specification Group Radio Access Network; Evolved Universal Terrestrial Radio Access (E-UTRA); Multiplexing and channel coding (Release 13)", Mar. 2016.

3GPP TS 36.213 V13.1.0, "3rd Generation Partnership Project; Technical Specification Group Radio Access Network; Evolved Universal Terrestrial Radio Access (E-UTRA); Physical layer procedures (Release 13)", Mar. 2016.

3GPP TSG RAN WG1 Meeting #84bis, R1-163112, NTT DOCOMO, Inc., "Initial views on frame structure for NR access technology", Apr. 2016.

3GPP TSG RAN WG1 Meeting #85, R1-165182, NTT DOCOMO, Inc., "Discussion on affinity for unlicensed spectrum access in 5G new radio", May 2016.

* cited by examiner

BASE STATION, TERMINAL, AND COMMUNICATION METHOD

TECHNICAL FIELD

The present disclosure relates to a base station, a terminal, and a communication method.

BACKGROUND ART

Through downlink communication in mobile communication, typically, a base station (also referred to as "eNB") transmits a control signal for data reception to a terminal (also referred to as "user equipment (UE)"). The terminal obtains information related to frequency assignment or adaptive control necessary for data reception by decoding control information transmitted to the terminal through the received control signal.

In the mobile communication, typically, a hybrid automatic repeat request (HARQ) is provided to downlink data. Accordingly, the terminal feeds, back to the base station, a response signal indicating a result of error detection in the downlink data.

The following describes, as a conventional technology, operation of the HARQ for downlink data in Long Term Evolution (LTE) standardized by the 3rd Generation Partnership Project (3GPP) (refer to NPLs 1 to 3, for example).

When performing communication in the LTE, a base station assigns a resource block (RB) in a system band to a terminal for each time unit called subframe. The base station transmits control information (DL grant) for receiving the downlink data by the terminal through a downlink control channel (physical downlink control channel (PDCCH)). The terminal obtains information related to frequency assignment or adaptive control necessary for data reception by decoding the control information transmitted to the terminal through a received PDCCH signal. The DL grant is also referred to as DL assignment.

In the LTE, a HARQ is provided to downlink data. Accordingly, the terminal feeds, back to the base station, a response signal indicating a result of error detection in the downlink data. The terminal performs cyclic redundancy check (CRC) on the downlink data and feeds, back to the base station, a response signal of positive response (acknowledgement (ACK)) when no error is found in a CRC calculation result, or negative response (negative acknowledgement (NACK)) when error is found in the CRC calculation result. The feedback of the response signal (ACK or NACK) is performed through an uplink control channel (physical uplink control channel (PUCCH)).

In a frequency division duplex (FDD) system of the LTE, the response signal for downlink data is transmitted through a PUCCH resource in a target subframe that is four subframes later than a subframe in which the downlink data is transmitted. In a time division duplex (TDD) system, the response signal for downlink data is transmitted through a PUCCH resource in a target subframe that is four subframes or more later than a subframe in which the downlink data is transmitted.

Data traffic in mobile communication continues exponential increase along with recent spread of service using mobile broadband, and thus it is an urgent task to increase data transmission capacity. In addition, exponential development is expected in the future for Internet of Things (IoT) in which any "things" are connected with each other through the Internet. To achieve service diversification through the IoT, exponential development is required not only for data transmission capacity but also for less delay and various requirements on a communication area (coverage) and the like. For these reasons, technology development and standardization have been made for the 5th generation mobile communication systems (5G) with significantly improved performance and function as compared to those of the 4th generation mobile communication systems (4G).

LTE-Advanced, which is standardized by the 3GPP, is a 4G radio access technology (RAT). In 5G standardization, the 3GPP proceeds development of a new radio access technology (new RAT (NR)) that is not necessarily backward compatible with LTE-Advanced.

In the NR, less delay as one 5G request condition is achieved by a discussed method (refer to NPL 4, for example) of what is called "self-contained" operation in which reception of a downlink control signal necessary for reception of downlink data, reception of the downlink data assigned by the downlink control signal, and feedback of a response signal for the downlink data to a base station are performed in a time unit of a constant time interval (for example, one subframe or NR subframe).

CITATION LIST

Non Patent Literature

NPL 1: 3GPP TS 36.211 V13.1.0, "Evolved Universal Terrestrial Radio Access (E-UTRA); Physical channels and modulation (Release 13)", March 2016.

NPL 2: 3GPP TS 36.212 V13.1.0, "Evolved Universal Terrestrial Radio Access (E-UTRA); Multiplexing and channel coding (Release 13)", March 2016.

NPL 3: 3GPP TS 36.213 V13.1.0, "Evolved Universal Terrestrial Radio Access (E-UTRA); Physical layer procedures (Release 13)", March 2016.

NPL 4: R1-163112, NTT DOCOMO, "Initial views on frame structure for NR access technology", April 2016

SUMMARY OF INVENTION

However, sufficient discussion has not been made on a method of scheduling the downlink control signal with taken into account the HARQ in the self-contained operation.

According to an aspect, the present disclosure provides a base station, a terminal, and a communication method that are capable of efficiently scheduling the downlink control signal with taken into account the HARQ in the self-contained operation.

A base station according to an aspect of the present disclosure is a base station including: a transmission unit configured to transmit a downlink control signal and downlink data assigned by the downlink control signal in a time unit including a downlink time resource for the downlink control signal, a downlink time resource for the downlink data, and an uplink time resource for a response signal for the downlink data; and a reception unit configured to receive the response signal in the time unit, in which a transmission bandwidth of the response signal is equal to or lower than a transmission bandwidth of the downlink data corresponding to the response signal.

A terminal according to another aspect of the present disclosure is a terminal including: a reception unit configured to receive a downlink control signal and downlink data assigned by the downlink control signal in a time unit including a downlink time resource for the downlink control signal, a downlink time resource for the downlink data, and an uplink time resource for a response signal for the downlink data; and a transmission unit configured to transmit a response signal for the downlink data in the time unit, in which a transmission bandwidth of the response signal is equal to or lower than a transmission bandwidth of the downlink data corresponding to the response signal.

It should be noted that general or specific embodiments may be implemented as a system, a method, an integrated circuit, a computer program, a storage medium, or any selective combination thereof.

According to an aspect, the present disclosure enables efficiently scheduling a downlink control signal with taken into account the HARQ in a self-contained operation.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Background of the Present Disclosure

First, the background of the present disclosure will be described below.

Figure 1:
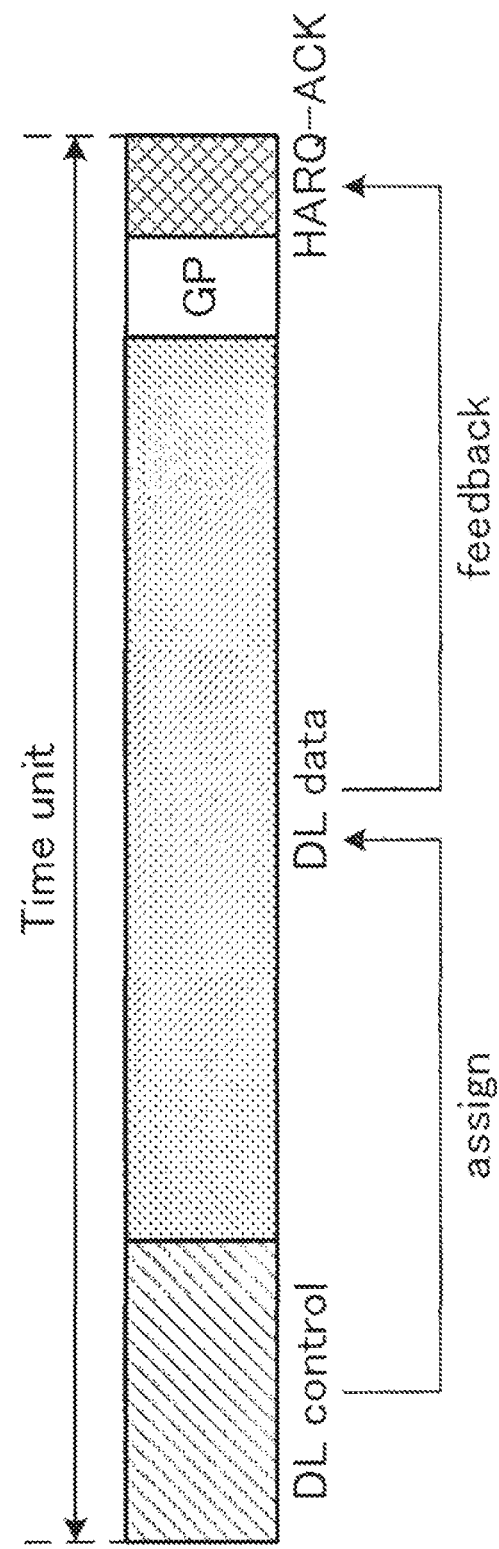
FIG. 1 is a diagram illustrating an exemplary self-contained operation in a TDD system.

FIG. 1 illustrates an exemplary self-contained operation in a TDD system. As illustrated in FIG. 1, a terminal performs, in a time unit (hereinafter referred to as "self-contained time unit") at a constant time interval, reception of a downlink control signal necessary for reception of downlink data, reception of downlink data assigned by the downlink control signal, and feedback of a response signal for the downlink data to a base station. In other words, as illustrated in FIG. 1 the self-contained time unit (referred to as "Time unit" in FIG. 1) includes a downlink time resource for a downlink control signal (DL control), a downlink time resource for downlink data (DL data) assigned by the downlink control signal, and an uplink time resource for the response signal for the downlink data (HARQ-ACK).

In the TDD system, a guard period (GP) for switching from downlink communication to uplink communication and decoding downlink data is provided.

The self-contained time unit is also referred to as a "self-contained NR subframe".

Figure 2:
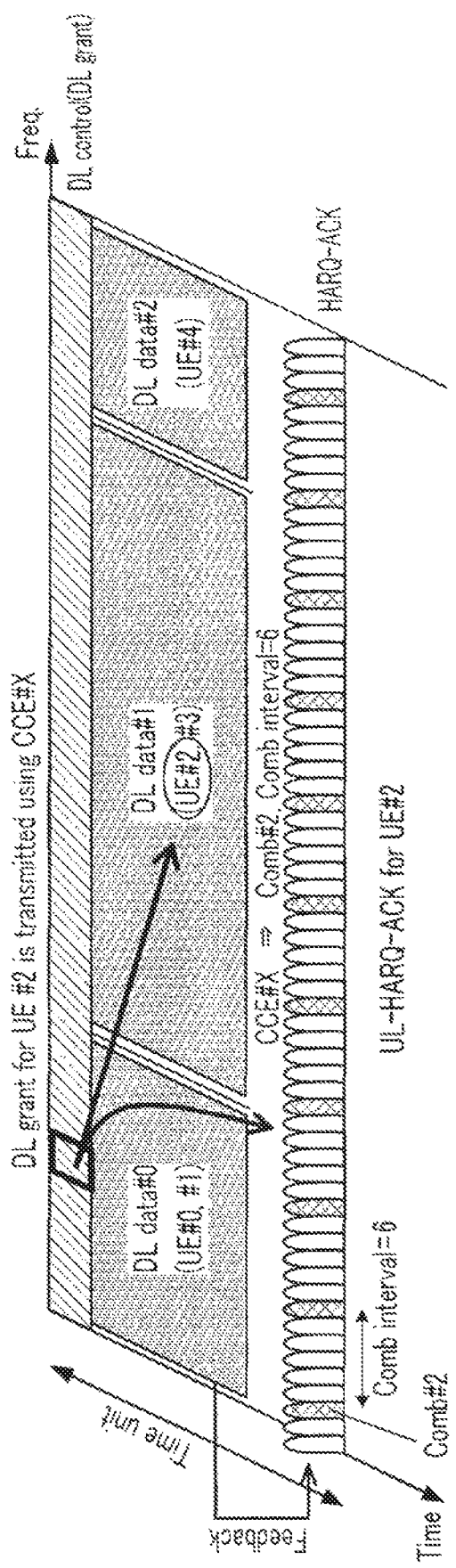
FIG. 2 is a diagram illustrating an exemplary HARQ operation in a self-contained time unit.

In the self-contained operation, uplink response signals (UL-HARQ-ACK) are transmitted by distributed transmission in which signals are transmitted at a predetermined sub carrier interval over the entire system band as illustrated in FIG. 2, similarly to a method of transmitting a sounding reference signal (SRS) of the LTE. The distributed transmission of uplink response signals over the entire system band obtains a frequency diversity gain.

In the self-contained operation, the transmission resource of an uplink response signal is notified by uniquely associating a start CCE index among control channel elements (CCEs) occupied by a downlink control signal (DL grant) with the transmission resource (such as a sub carrier position or a code sequence number) of the uplink response signal as illustrated in FIG. 2, similarly to a method of notifying a PUCCH resource (orthogonal code sequence number) used for transmission of the uplink response signal in the LTE. When the transmission resource of the uplink response signal is indirectly (implicitly) notified through CCEs used in the DL grant, the overhead of the DL grant does not increase.

For example, in FIG. 2, UEs #2 and #3 are multiplexed in the transmission band of DL data #1 by multi-user (MU)-MIMO. The start CCE index number of a radio resource occupied by a downlink control signal (DL grant) for scheduling downlink data for UE #2 is X (CCE # X). The correspondence relation between the CCE index and the transmission resource of the uplink response signal is shared between the base station and the terminal through definition in advance with specifications or through notification from the base station to the terminal in the unit of a cell in advance. In FIG. 2, when the CCE index is X, the transmission resource of the uplink response signal is uniquely associated with the comb number (sub carrier position) of "2" and the comb interval (sub carrier interval) of "6". Accordingly, UE #2 performs distributed transmission of the uplink response signal over the entire system band through a radio resource (uplink resource) specified by the comb number of "2" and the comb interval of "6".

However, in the operation illustrated in FIG. 2, scheduling of the downlink control signal (DL grant) is complicated.

Specifically, a scheduler at the base station needs to select the transmission resource (which is the start CCE index) of the DL grant with taken into account orthogonal assignment of the transmission resources of the uplink response signals and DL grant reception performance at a plurality of UEs multiplexed in the system band.

For example, in FIG. 2, DL data of five UEs of UEs #0 to #4 in the system band is scheduled. In this case, the scheduler at the base station needs to select the transmission resource of the DL grant for each UE with taken into account orthogonal assignment of the transmission resource of the uplink response signal at these five UEs and a transmission band with which the five UEs each satisfy reception performance.

In particular, in the self-contained operation, less resource is available for transmission of the uplink response signal as compared to the LTE. Thus, when the number of resources available for orthogonal assignment of the uplink response signals is small as in the self-contained operation, more complicated scheduling is requested for the DL grant. For example, at scheduling of the DL grant, when orthogonal resource assignment of the uplink response signals cannot be achieved with the CCE index of the DL grant, downlink data cannot be scheduled at a desired timing for some terminals, which leads to an increased delay time.

Thus, an aspect of the present disclosure is intended to efficiently schedule the downlink control signal in the self-contained operation by appropriately controlling an uplink frequency resource for transmission of the uplink response signal for downlink data in the self-contained time unit.

Embodiments of the present disclosure will be described below in detail with reference to the accompanying drawings.

[Outline of Communication System]

A communication system according to each embodiment of the present disclosure includes a base station 100 and a terminal 200.

The following description assumes a TDD system. However, an aspect of the present disclosure is also applicable to a FDD system in a similar manner as described later.

Figure 3:
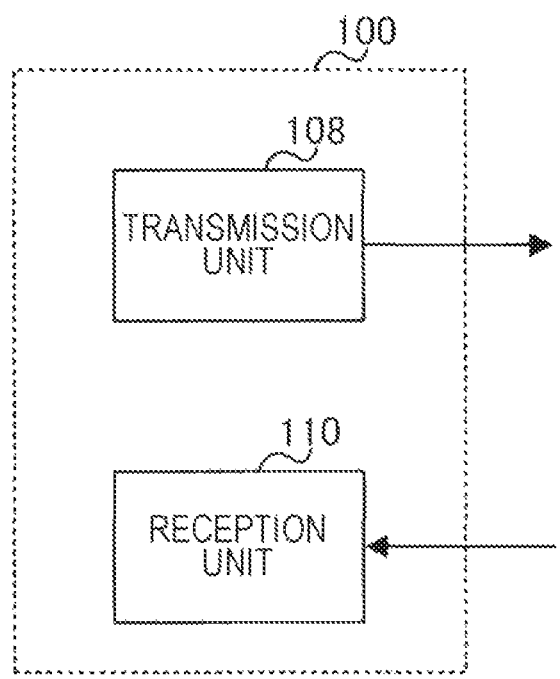
FIG. 3 is a block diagram illustrating a main part configuration of a base station according to an embodiment.

FIG. 3 is a block diagram illustrating a main part configuration of the base station 100 according to each embodiment of the present disclosure. In the base station 100 illustrated in FIG. 3, when a time unit (the self-contained time unit) includes a downlink time resource for a downlink control signal, a downlink time resource for downlink data assigned by the downlink control signal, and an uplink time resource for a response signal for the downlink data, a transmission unit 108 transmits the downlink control signal and the downlink data in the time unit. A reception unit 110 receives the response signal in the time unit. The transmission bandwidth of the response signal is equal to or lower than the transmission bandwidth of the downlink data corresponding to the response signal.

Figure 4:
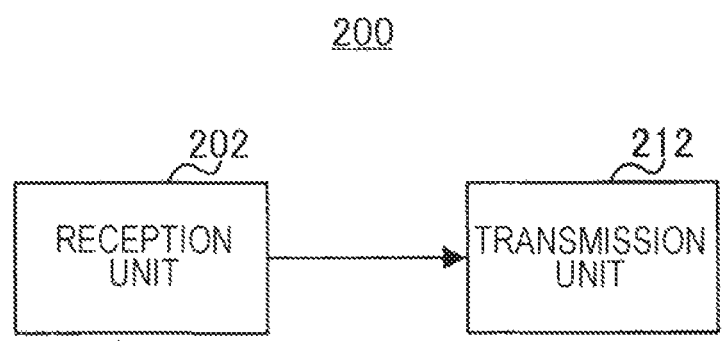
FIG. 4 is a block diagram illustrating a main part configuration of a terminal according to the embodiment.

FIG. 4 is a block diagram illustrating a main part configuration of the terminal 200 according to each embodiment of the present disclosure. In the terminal 200 illustrated in FIG. 4, when a time unit (self-contained time unit) includes a downlink time resource for a downlink control signal, a downlink time resource for downlink data assigned by the downlink control signal, and an uplink time resource for a response signal for the downlink data, a reception unit 202 receives the downlink control signal and the downlink data in the time unit. A transmission unit 212 transmits the response signal for the downlink data in the time unit. The transmission bandwidth of the response signal is equal to or lower than the transmission bandwidth of the downlink data corresponding to the response signal.

[Configuration of Base Station]

Figure 5:
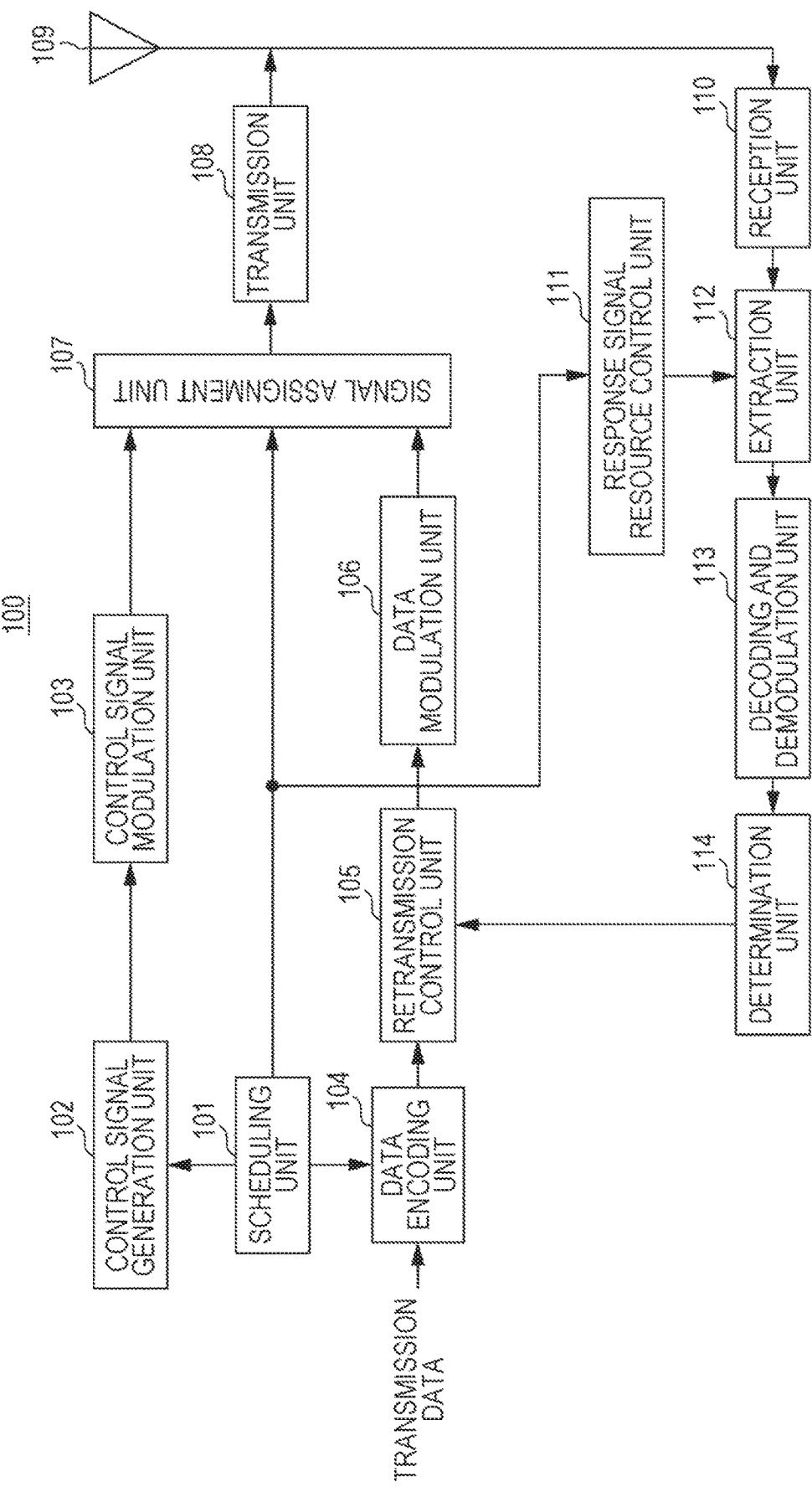
FIG. 5 is a block diagram illustrating the configuration of the base station according to the embodiment.

FIG. 5 is a block diagram illustrating the configuration of the base station 100 according to the present embodiment. In FIG. 5, the base station 100 includes a scheduling unit 101, a control signal generation unit 102, a control signal modulation unit 103, a data encoding unit 104, a retransmission control unit 105, a data modulation unit 106, a signal assignment unit 107, the transmission unit 108, an antenna 109, the reception unit 110, a response signal resource control unit 111, an extraction unit 112, a demodulation and decoding unit 113, and a determination unit 114.

The scheduling unit 101 determines, for the terminal 200, scheduling information (for example, assignment resource information (frequency, time, and code resource), a terminal ID, data demodulation reference signal (DMRS) information, and a modulation and encoding scheme) related to a downlink control signal and downlink data in the self-contained time unit. The scheduling unit 101 outputs the scheduling information to the control signal generation unit 102, the data encoding unit 104, the signal assignment unit 107, and the response signal resource control unit 111.

The control signal generation unit 102 generates a control signal for the terminal 200, The control signal includes a signal unique to a cell at a higher-level layer, a signal unique to a group or a RAT at a higher-level layer, a signal unique to a terminal t a higher-level layer, and downlink assignment information (scheduling information) instructing downlink data assignment. The control signal generation unit 102 generates a control information bit string based on this control information, encodes the generated control information bit string, and outputs a control signal obtained through the encoding to the control signal modulation unit 103.

The control signal modulation unit 103 modulates the control signal received from the control signal generation unit 102, and outputs the modulated control signal (symbol string) to the signal assignment unit 107.

The data encoding unit 104 performs error correction encoding on transmission data (downlink data) in accordance with the encoding scheme received from the scheduling unit 101, and outputs a data signal obtained by the encoding to the retransmission control unit 105.

At transmission for the first time, the retransmission control unit 105 holds the encoded data signal received from the data encoding unit 104, and outputs the encoded data signal to the data modulation unit 106. At retransmission, the retransmission control unit 105 controls held data based on result determination which is received from the determination unit 114. Specifically, when having received a NACK for a transmitted data signal, the retransmission control unit 105 outputs the corresponding held data to the data modulation unit 106. When having received an ACK to transmitted data, the retransmission control unit 105 deletes corresponding held data and terminates transmission of the downlink data.

The data modulation unit 106 modulates the data signal received from the retransmission control unit 105, and outputs the modulated data signal to the signal assignment unit 107.

The signal assignment unit 107 maps, to the radio resource instructed by the scheduling unit 101, the control signal (symbol string) received from the control signal modulation unit 103 and the modulated data signal received from the data modulation unit 106. The signal assignment unit 107 outputs a downlink signal to which the signals are mapped to the transmission unit 108.

The transmission unit 108 performs radio frequency (RF) processing such as digital-to-analog (D/A) conversion and up-conversion on a signal received from the signal assignment unit 107, and transmits a radio signal to the terminal 200 through the antenna 109.

The reception unit 110 performs RF processing such as down-conversion or analog-to-digital (A/D) conversion on the waveform of the response signal for an uplink signal received from the terminal 200 through the antenna 109, and outputs a received signal thus obtained to the extraction unit 112.

The response signal resource control unit 111 determines a radio resource (frequency, time, and code resource) used for transmission of a response signal based on scheduling information (such as downlink data assignment resource information, a terminal ID, and data demodulation reference signal information) of the terminal 200 in the self-contained time unit, which is output from the scheduling unit 101. The response signal resource control unit 111 outputs information indicating the determined radio resource to the extraction unit 112. A response signal radio resource determination method at the response signal resource control unit 111 will be described later in detail.

The extraction unit 112 extracts a radio resource part with which an uplink response signal is transmitted, from the received signal based on the information which are received from the response signal resource control unit 111, and outputs a reception response signal to the demodulation and decoding unit 113.

The demodulation and decoding unit 113 performs equalization, demodulation, and decoding on the reception response signal received from the extraction unit 112, and outputs a bit sequence obtained through the decoding to the determination unit 114.

The determination unit 114 determines whether the response signal transmitted from the terminal 200 indicates any of ACK and NACK to transmitted downlink data based on the bit sequence input from the demodulation and decoding unit 113. The determination unit 114 outputs a result of the determination (ACK or NACK) to the retransmission control unit 105.

[Configuration of Terminal]

Figure 6:
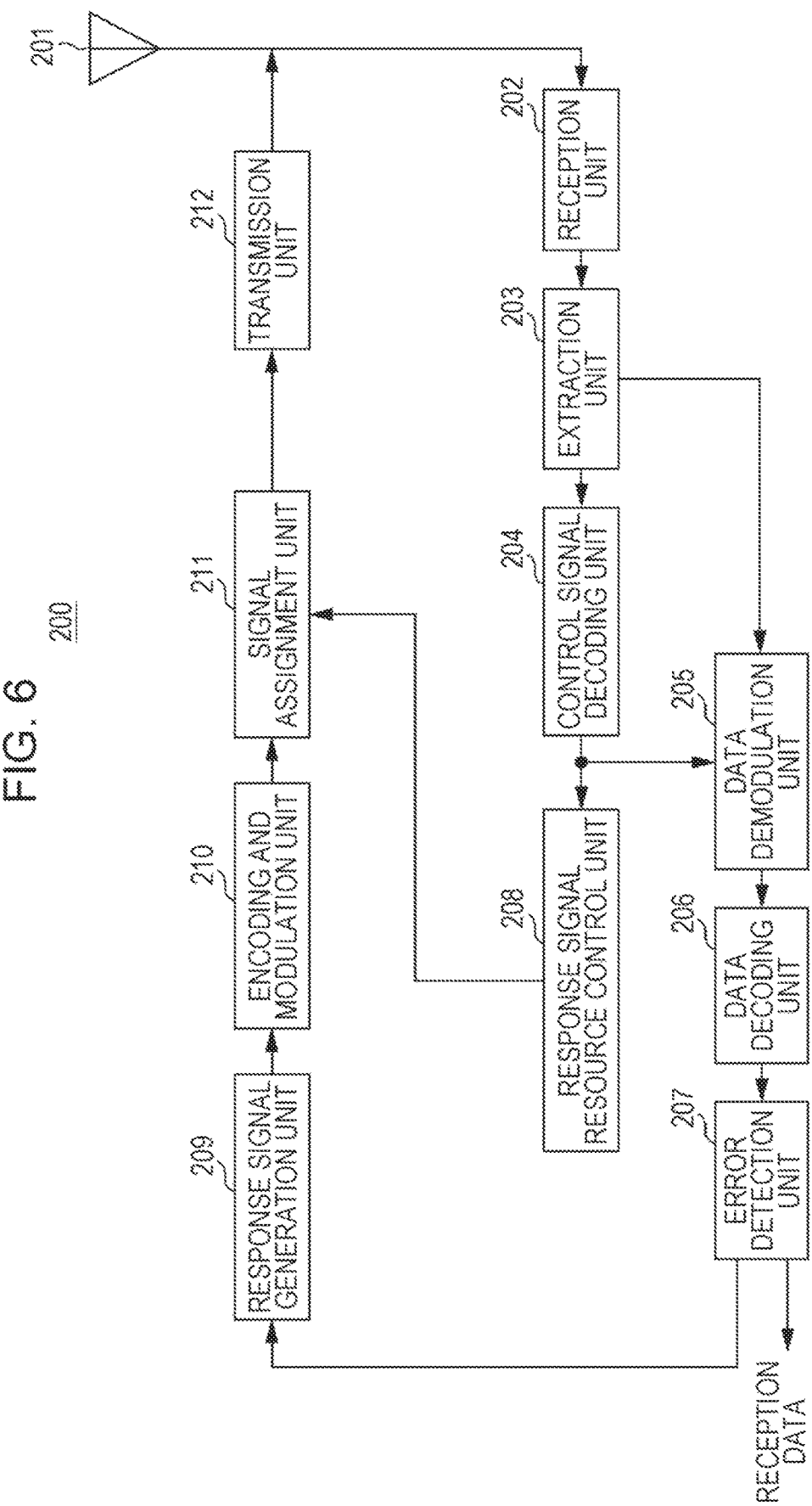
FIG. 6 is a block diagram illustrating the configuration of the terminal according to the embodiment.

FIG. 6 is a block diagram illustrating the configuration of the terminal 200 according to the embodiment. In FIG. 6, the terminal 200 includes an antenna 201, the reception unit 202, an extraction unit 203, a control signal decoding unit 204, a data demodulation unit 205, a data decoding unit 206, an error detection unit 207, a response signal resource control unit 208, a response signal generation unit 209, an encoding and modulation unit 210, a signal assignment unit 211, and a transmission unit 212.

The reception unit 202 receives, through the antenna 201, a control signal and a data signal transmitted from the base station 100, and obtains a baseband signal by performing RF processing such as down-conversion or AD conversion on a wireless received signal. The reception unit 202 outputs the signal to the extraction unit 203.

The extraction unit 203 extracts a control signal from the signal received from the reception unit 202 and outputs the extracted control signal to the control signal decoding unit 204. The extraction unit 203 also extracts downlink data from the signal received from the reception unit 202, and outputs the extracted downlink data to the data demodulation unit 205.

The control signal decoding unit 204 tries decoding of a control signal targeted to the terminal 200 by performing blind decoding on the control signal received from the extraction unit 203. When having determined through the blind decoding that the control signal is targeted to the terminal 200, the control signal decoding unit 204 outputs scheduling information (for example, assignment resource information (frequency, time, and code resource), a terminal ID, DMRS information, and a modulation and encoding scheme) included in the control signal to the data demodulation unit 205 and the response signal resource control unit 208.

The data demodulation unit 205 demodulates the downlink data received from the extraction unit 203 based on the downlink data assignment resource information received from the control signal decoding unit 204, and outputs the demodulated downlink data to the data decoding unit 206.

The data decoding unit 206 decodes the downlink data received from the data demodulation unit 205, and outputs the decoded downlink data to the error detection unit 207.

The error detection unit 207 performs error detection by, for example, CRC on the downlink data received from the data decoding unit 206, and outputs a result (ACK or NACK) of the error detection to the response signal generation unit 209. The error detection unit 207 outputs, as reception data, the downlink data determined to have no error through the error detection.

The response signal resource control unit 208 determines radio resources (frequency, time, and code resource) used for transmission of a response signal by a method same as that used by the response signal resource control unit 111 (FIG. 5) of the base station 100 based on scheduling information (for example, information related to downlink data assignment resources (frequency, time, and code resource), a terminal ID, and data demodulation reference signal information) of the terminal 200 in the self-contained time unit, which is output from the control signal decoding unit 204. The response signal resource control unit 208 outputs information indicating the determined radio resources to the signal assignment unit 211. The response signal radio resource determination method at the response signal resource control unit 208 will be described later in detail.

The response signal generation unit 209 generates a response signal (bit string) for the received downlink data based on the error detection result (ACK or NACK) received from the error detection unit 207, and outputs the response signal to the encoding and modulation unit 210.

The encoding and modulation unit 210 performs error correction encoding on the response signal (bit sequence) received from the response signal generation unit 209, modulates a bit sequence obtained through the encoding, and outputs a symbol sequence obtained through the modulation to the signal assignment unit 211.

The signal assignment unit 211 maps a signal received from the encoding and modulation unit 210 to an uplink resource (time, frequency, and code resource) in the self-contained time unit instructed by the response signal resource control unit 208. The signal assignment unit 211 may assigns the response signal at a predetermined sub carrier interval by distributed transmission.

The transmission unit 212 performs RF processing such as D/A conversion and up-conversion on a signal received from the signal assignment unit 211 and transmits a radio signal to the base station 100 through the antenna 201.

[Operations of the Base Station 100 and the Terminal 200]

The following describes operations of the base station 100 and the terminal 200 having the above-described configurations in detail.

The following describes methods 1 to 5 of determining radio resources used for transmission of the response signal at the base station 100 (response signal resource control unit 111) and the terminal 200 (response signal resource control unit 208).

<Determination Method 1>

In the determination method 1, the base station 100 and the terminal 200 restricts the transmission band of the uplink response signal in the self-contained operation to be within the range of the transmission band of the downlink data.

Figure 7:
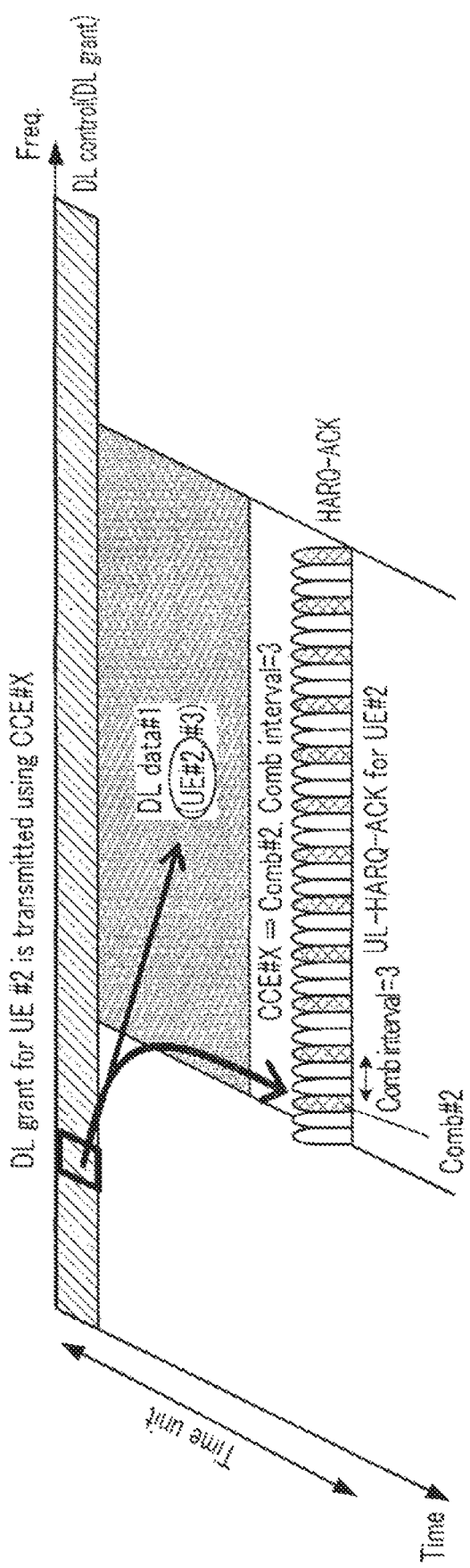
FIG. 7 is a diagram illustrating an exemplary HARQ operation in the self-contained time unit according to a determination method 1 of the embodiment.

FIG. 7 illustrates exemplary frequency resource assignment of the downlink data (DL data) and the uplink response signal (HARQ-ACK) according to the determination method 1.

In FIG. 7, the base station 100 transmits the downlink control signal (DL grant) to the terminal (UE #2) having the terminal ID of "2" in the self-contained time unit, and transmits DL data #1 (downlink data) assigned by the DL grant. Then, UE #2 (terminal 200) feeds the uplink response signal (HARQ-ACK) corresponding to a result of error detection of the received DL data #1 back to the base station 100 through the uplink resource in the self-contained time unit.

In this case, uplink radio resources used for transmission of the response signal may be orthogonalized between a plurality of UEs by distributed transmission using different sub carriers (comb) between the UEs (refer to FIG. 7, for example), or by CDMA using different orthogonal codes between the UEs.

Similarly to the LTE, a radio resource used for transmission of the uplink response signal may be indirectly (implicitly) notified through unique association between the start CCE index of a resource occupied by the downlink control signal (DL grant) and uplink resources (orthogonal resources). In other words, the uplink radio resources used for transmission of the response signal are associated with a radio resource used for transmission of the downlink control signal including assignment information of the downlink data corresponding to the uplink response signal. For example, the CCE index (in FIG. 7, CCE # X) of a resource used for transmission of the downlink control signal may be uniquely associated with the comb number and comb interval (in FIG. 7, Comb #2 and Comb interval=3) of a sub carrier used for transmission of the uplink response signal. In this manner, a plurality of UEs can be orthogonalized in the transmission band of the uplink response signal without increasing the overhead of the DL grant.

The base station 100 and the terminal 200 match the transmission band of the uplink response signal with the transmission band of the downlink data. For example, in FIG. 7, the base station 100 and UE #2 (terminal 200) determine the transmission band of the uplink response signal (UL HARQ-ACK for UE #2) at UE #2 to be a frequency band identical to the transmission band of DL data #1 as the downlink data targeted to UE #2.

Accordingly, only UEs multiplexed by MU-MIMES in the transmission band of the downlink data transmit the uplink response signals in the transmission band of the downlink data targeted to each UE. For example, in FIG. 7, UE #2 and UE #3 are multiplexed by MU-MIMO in the transmission band of DL data #1 targeted to UE #2. Accordingly, only UE #2 and UE #3 transmit the uplink response signals through the transmission band of DL data #1. In other words, no uplink response signals are transmitted from the other UE #0, UE #1, and UE #4 (refer to FIG. 2, for example) in the transmission band of DL data #1.

Thus, the scheduling unit 101 of the base station 100 needs to select the transmission resource (start CCE index) of the DL grant only for UE #2 and UE #3 multiplexed in the transmission band of DL data #1 with taken into account orthogonal assignment of the transmission resources of the uplink response signals and DL grant reception performance. This is same for the other transmission bands of the downlink data in FIG. 7.

Accordingly, at the scheduling unit 101 of the base station 100, the number of terminals needed to be considered at orthogonal resource assignment of the uplink response signals can be reduced as compared to the method of transmitting the uplink response signals through the entire system band as illustrated in FIG. 2. Thus, the determination method 1 achieves easy scheduling of the downlink control signal (DL grant) at the base station 100.

Figure 8:
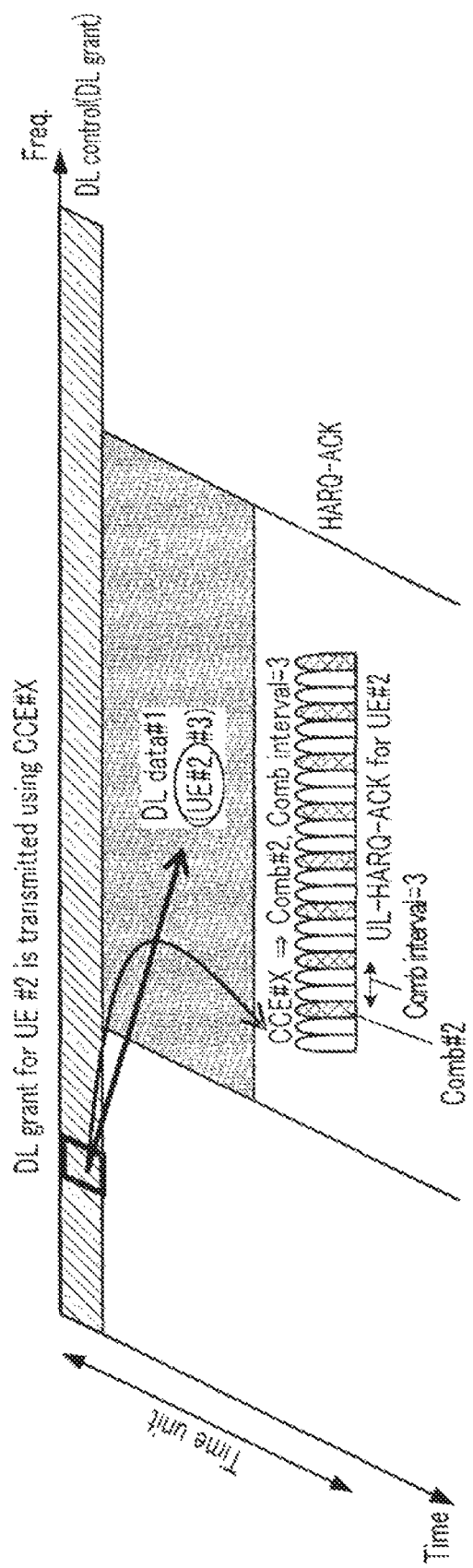
FIG. 8 is a diagram illustrating another exemplary HARQ operation in the self-contained time unit according to the determination method 1 of the embodiment.

The transmission band of the uplink response signal does not necessarily need to match with the transmission band of the downlink data as illustrated in FIG. 7. The transmission band of the uplink response signal may be any band in the transmission band of the downlink data corresponding to the response signal. For example, as illustrated in FIG. 8, the transmission band of the uplink response signal may be restricted to a partial band (in FIG. 8, for example, the center) in the transmission band of the downlink data. For example, the base station 100 may restrict the transmission bandwidth of the uplink response signal to be equal to or narrower than a predetermined bandwidth to increase the density of transmission power of the uplink response signal. In this case, as illustrated in FIG. 8, the transmission band of the uplink response signal may be set to be narrower than the transmission band of the downlink data in some cases.

As described above, in the determination method 1, the base station 100 and the terminal 200 restricts the transmission band of the uplink response signal to be within the transmission band of the downlink data. Accordingly, the transmission bandwidth of the uplink response signal is equal to or lower than the transmission bandwidth of the downlink data corresponding to the response signal.

In this manner, the number of terminals needed to be considered at orthogonal resource assignment of the uplink response signals can be reduced as compared to a case in which the uplink response signal is transmitted through the entire system band (refer to FIG. 2, for example). This achieves easy scheduling (frequency resource assignment) of the downlink control signal (DL grant) at the base station 100. This can lower the probability that orthogonal resource assignment of the uplink response signals cannot be achieved at some terminals due to assignment of the CCE index of the DL grant at scheduling of the DL grant in the self-contained operation in which the number of resources available for orthogonal resource assignment of the uplink response signals is small as compared to the LTE. In addition, the number of terminals 200 for which the downlink data cannot be scheduled at a desired timing is reduced, thereby preventing increase of the delay time.

As described above, according to the determination method 1, an uplink frequency resource for transmission of the uplink response signal for the downlink data in the self-contained time unit can be appropriately controlled to efficiently perform scheduling of the downlink control signal when the self-contained operation is used.

In the TDD system, the downlink data is scheduled in a band for which the quality of reception at the terminal 200 is favorable. Thus, according to the determination method 1, a frequency scheduling gain same as that for the downlink data can be obtained for the uplink response signal assigned in the transmission band of the downlink data.

The terminal 200 can specify the radio resource of the uplink response signal based on the transmission band of the downlink data notified by the DL grant, and parameters (in FIGS. 7 and 8, a comb number and a comb interval)

uniquely associated with a resource (start CCE index) used for transmission of the DL grant. Thus, according to the determination method 1, the overhead of a control signal for notification of the radio resource of the uplink response signal does not increase.

<Determination Method 2>

In the determination method 2, similarly to the determination method 1, the transmission band of the uplink response signal in the self-contained operation is restricted to be within the transmission band of the downlink data.

In the determination method 1, uplink radio resources (for example, a comb number, a comb interval, and an orthogonal code number) used for transmission of the response signal are uniquely associated with the resource (start CCE index) used for transmission of the downlink control signal (DL grant). However, in the determination method 2, the radio resources of the uplink response signal are uniquely associated with scheduling information (for example, a terminal ID and DMRS information) for each terminal 200.

The scheduling information uniquely associated with the radio resources of the uplink response signal in the determination method 2 is different between the terminals 200 that transmit the downlink data in an identical frequency band.

Figure 9:
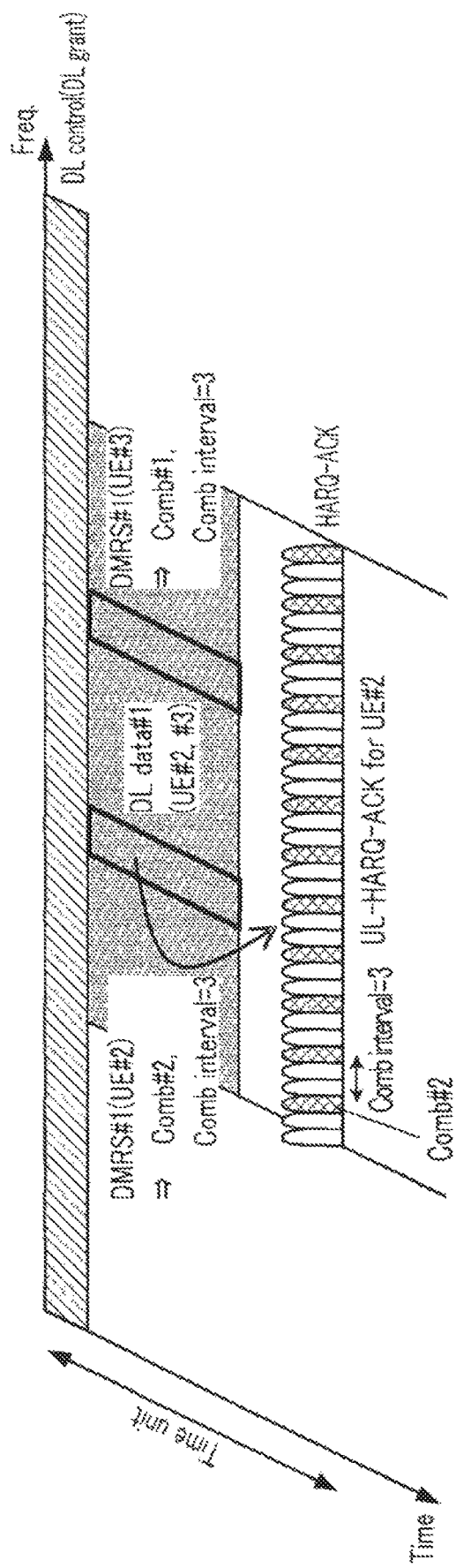
FIG. 9 is a diagram illustrating an exemplary HARQ operation in the self-contained time unit according to a determination method 2 of the embodiment.

FIG. 9 illustrates exemplary frequency resource assignment of the downlink data (DL data) and the uplink response signal (HARQ-ACK) according to the determination method 2.

In FIG. 9, similarly to the determination method 1, the base station 100 transmits the downlink control signal (DL grant) to the terminal (UE #2) having the terminal ID of "2" and the terminal (UE #3) having the terminal ID of "3" in the self-contained time unit, and performs MU-MIMO transmission of DL data #1 (downlink data) through the DL grant. Then, UEs #2 and #3 (terminals 200) each feed the uplink response signal (HARQ-ACK) corresponding to a result of error detection of the received DL data #1 back to the base station 100 through the uplink resource in the self-contained time unit.

In this case, similarly to the determination method 1, UEs #2 and #3 transmit the uplink response signal in the transmission band of DL data #1. Since the transmission band of the uplink response signal is restricted to be within the transmission band of the downlink data as described above, the terminals 200 multiplexed in the transmission band of the uplink response signal are terminals (hereinafter referred to as MU-MIMO terminals; in FIG. 9, UEs #2 and #3) for which the downlink data is multiplexed by MU-MIMO in an identical frequency band.

In the determination method 2, the base station 100 and the terminals 200 (UEs #2 and #3) determine, based on the scheduling information of each terminal 200, an uplink resource (orthogonal resource) used for transmission of the uplink response signal at the terminal 200 in the transmission band of the downlink data (DL data #1) to the terminals 200.

For example, the base station 100 needs to notify information (DMRS information) related to DMRSs with different numbers to each MU-MIMO terminal through the DL grant or the like to receive the downlink data. Thus, the DMRS information notified by the DL grant is scheduling information that is different between the terminals 200.

The base station 100 and each terminal 200 may uniquely associate the DMRS number with uplink resources (orthogonal resources; for example, a comb number; a comb interval, and an orthogonal code number) used for transmission of the uplink response signal. Accordingly, the uplink response signals can be orthogonalized between the terminals 200 for which the transmission band of the uplink response signal is same in accordance with the scheduling information of each terminal 200.

The correspondence relation between a DMRS number and an uplink response signal orthogonal resource is shared between the base station 100 and each terminal 200 in advance through, for example, specifications or information unique to a cell. Partial of uplink response signal radio resource information may be notified through the DL grant. For example, the comb interval of the uplink response signal may be explicitly notified through the DL grant, and the comb number of the uplink response signal may be uniquely associated with the DMRS number and indirectly (implicitly) notified.

For example, in FIG. 9, a reference signal (DMRS #0) with the DMRS number of "0" is assigned to UE #2 for downlink data demodulation, and a reference signal (DMRS #1) with the DMRS number of "1" is assigned to UE #3 for downlink data demodulation. In FIG. 9, DMRS #0 is uniquely associated with the comb number of "2" and the comb interval of "3", and DMRS #1 is uniquely associated with the comb number of "1" and the comb interval of "3".

Thus, in FIG. 9, an uplink resource (with the comb number=2 and the comb interval=3) used by UE #2 (DMRS #0) for transmission of the uplink response signal is different from (in other words, orthogonal to) an uplink resource (with the comb number=1 and the comb interval=3) used by UE #3 (DMRS #1) for transmission of the uplink response signal.

In this manner, according to the determination method 2, scheduling information (in FIG. 9, the DMRS number) that is different between a plurality of terminals 200 for which the downlink data is assigned to an identical frequency band is uniquely associated with an uplink resource used for transmission of the uplink response signal.

Accordingly, the base station 100 can perform scheduling (in other words, frequency assignment (such as assignment of a CCE number for transmission) determination) of a downlink control signal (DL grant) without uplink response signal resource assignment (assignment of the start CCE index or the like) taken into consideration. Thus, the determination method 2 achieves easier scheduling of the downlink control signal (DL grant) at the base station 100 as compared to the determination method 1.

Similarly to the determination method 1, the downlink data is scheduled in a band for which the quality of reception at the terminal 200 is favorable in the TDD system, Thus, according to the determination method 2, a frequency scheduling gain same as that for the downlink data can be obtained for the uplink response signal assigned in the transmission band of the downlink data.

The terminal 200 can specify the radio resource of the uplink response signal based on the transmission band of the downlink data notified by the DL grant, and parameters (in FIG. 9, a comb number and a comb interval) uniquely associated with the scheduling information (in FIG. 9, DMRS information) of the terminal 200. Thus, according to the determination method 2, similarly to the determination method 1, the overhead of a control signal for notification of the uplink response signal radio resource does not increases.

Although FIG. 9 illustrates a case in which a DMRS number is used as exemplary scheduling information associated with the radio resource of the uplink response signal, the scheduling information associated with the radio resource of the uplink response signal may be any information that is different between the terminals 200. For example, the radio resource of the uplink response signal may be uniquely associated with a terminal ID (UE ID). In this case, the base station 100 may select a plurality of terminals 200 having terminal IDs associated with the radio resources of the uplink response signals orthogonal to each other, and perform MU-MIMO multiplexing of these terminals 200. This achieves orthogonal resource assignment of the uplink response signals transmitted by the terminals 200.

<Determination Method 3>

In the determination method 3, similarly to the determination method 1, the transmission band of the uplink response signal in the self-contained operation is restricted to be within the transmission band of the downlink data.

The determination method 3 has further features as follows.

Single carrier transmission, which has low cubic metric (CM) and low peak-to-average power ratio (PAPR) features, may be applied to transmission of the uplink response signal by a UE to improve coverage performance. In the single carrier transmission, the CM and the PAPR tend to increase with the number of bundles (hereinafter referred to as cluster) of continuous bands used for data transmission.

In the determination method 3, the number of clusters in the transmission band of the downlink data transmitted in the self-contained operation is restricted to be equal to or smaller than a predetermined threshold.

Specifically, in the determination method 3, along with restriction on the number of clusters assigned for the downlink data, the number of clusters in the transmission band of the uplink response signal in the self-contained operation is restricted to be equal to or smaller than the threshold.

Specifically, the scheduling unit 101 of the base station 100 assigns a downlink resource so that the number of clusters for the downlink data is equal to or smaller than the predetermined threshold. The threshold may be the maximum number of clusters with which the CM and the PAPR are equal to or smaller than predetermined values in the single carrier transmission. The number of clusters set as the threshold may be derived in advance, and may be set in specifications or set as a parameter unique to a cell in advance.

Figure 10:
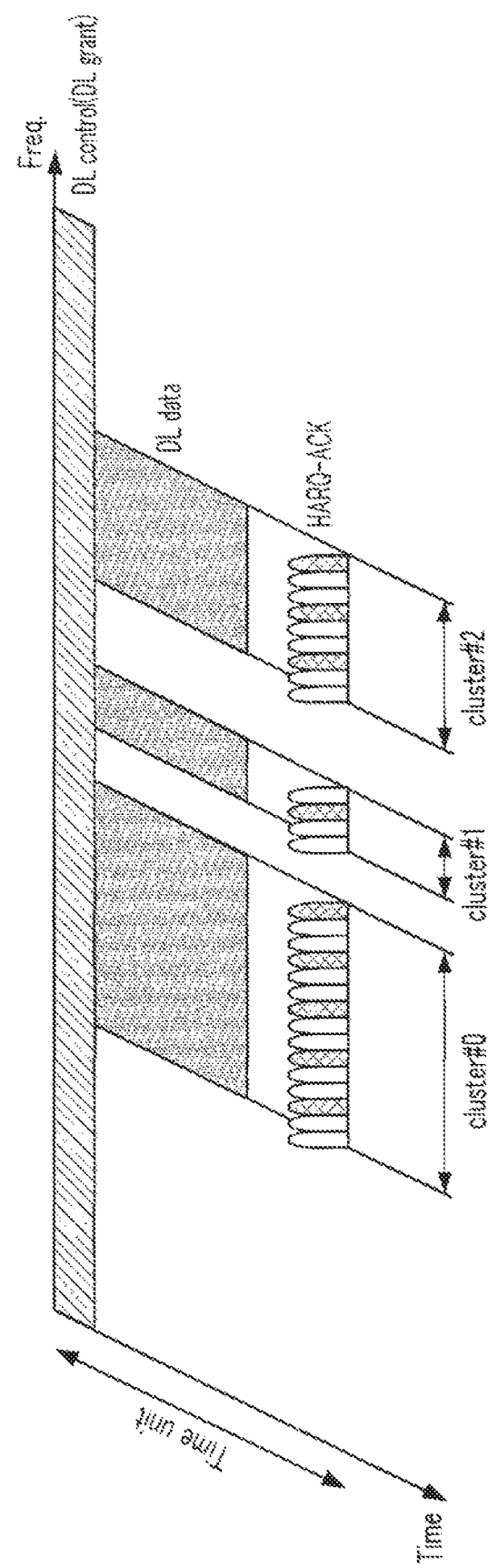
FIG. 10 is a diagram illustrating an exemplary HARQ operation in the self-contained time unit according to a determination method 3 of the embodiment.

FIG. 10 illustrates exemplary frequency resource assignment of the downlink data (DL data) and the uplink response signal (HARQ-ACK) according to the determination method 3.

In FIG. 10, the threshold of the number of clusters is set to be a value equal to or larger than three 3. Thus, in FIG. 10, the scheduling unit 101 of the base station 100 assigns, to the downlink data targeted to the terminal 200, three clusters (clusters #0 to #2), the number of which is equal to or smaller than the threshold.

Specifically, the base station 100 (response signal resource control unit 111) and the terminal 200 (response signal resource control unit 208) determine clusters #0 to #2 each as the transmission band of the downlink data targeted to the terminal 200 to be the transmission band of the uplink response signal (HARQ-ACK).

In this manner, in the determination method 3, since the number of clusters for the downlink data in the self-contained operation is restricted to be the predetermined threshold, the uplink response signal transmitted in a frequency band identical to the transmission band of the downlink data is also transmitted through clusters, the number of which is equal to or smaller than the predetermined threshold. Thus, according to the determination method 3, the CM and the PAPR can be prevented from increasing in single carrier transmission of the uplink response signal.

<Determination Method 4>

In the determination method 4, similarly to the determination method 1, the transmission band of the uplink response signal in the self-contained operation is restricted to be within the transmission band of the downlink data.

In the determination method 4, the number of clusters in the transmission band of the uplink response signal is restricted to be equal to or smaller than a predetermined threshold with taken into account a viewpoint related to the CM and the PAPR similarly to that in the determination method 3.

Specifically, the response signal resource control unit 111 of the base station 100 and the response signal resource control unit 208 of the terminal 200 assign a response signal uplink resource so that the number of clusters in the transmission band of the uplink response signal is equal to or smaller than the predetermined threshold. Similarly to the determination method 3, the threshold may be the maximum number of clusters with which the CM and the PAPR are equal to or smaller than predetermined values in the single carrier transmission. The number of clusters set as the threshold may be derived in advance, and may be set in specifications or set as a parameter unique to a cell in advance, FIG. 11 illustrates exemplary frequency resource assignment of the downlink data (DL data) and the uplink response signal (HARQ-ACK) according to the determination method 4.

Figure 11:
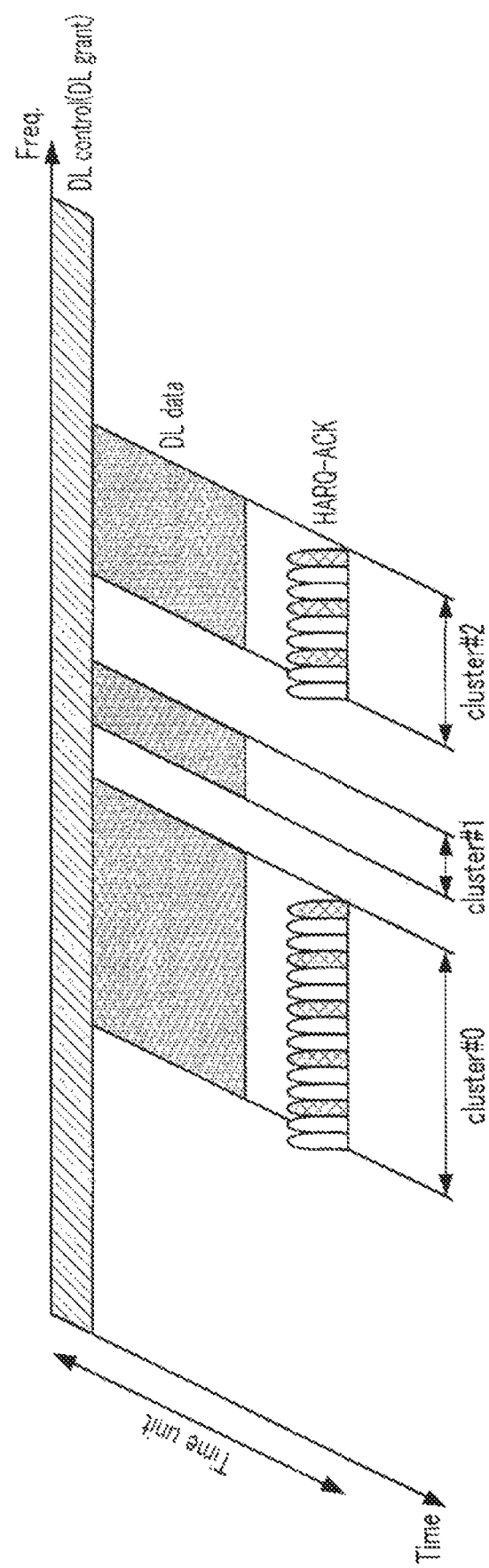
FIG. 11 is a diagram illustrating an exemplary HARQ operation in the self-contained time unit according to a determination method 4 of the embodiment.

In FIG. 11, the threshold of the number of clusters is set to be two. In FIG. 11, the scheduling unit 101 of the base station 100 assigns three clusters (clusters #0 to #2) to the downlink data targeted to the terminal 200.

In this case, the base station 100 (response signal resource control unit 111) and the terminal 200 (response signal resource control unit 208) determine the transmission band of the uplink response signal (HARQ-ACK) to be clusters, the number of which is equal to or smaller than the threshold of "2" in the transmission band (clusters #0 to #2) of the downlink data targeted to the terminal 200. For example, as illustrated in FIG. 11, the base station 100 and the terminal 200 may select, as the radio resource of the uplink response signal, clusters (clusters #0 and #2) in the order of the widest bandwidth per cluster among a plurality of clusters (clusters #0 to #2). In other words, the transmission band of the uplink response signal corresponds to clusters that have a larger bandwidth per cluster and the number of which is equal to or smaller than the threshold among a plurality of clusters to which the downlink data is assigned.

In this manner, in the determination method 4, since the number of clusters for the uplink response signal is restricted to be equal to or smaller than the predetermined threshold in the self-contained operation, the CM and the PAPR can be prevented from increasing in single carrier transmission of the uplink response signal.

Among a plurality of clusters in the transmission band of the downlink data, a cluster having a wider bandwidth per cluster is selected in priority to the transmission band of the uplink response signal. Thus, the transmission bandwidth of the uplink response signal can be widened while the CM and the PAPR are prevented from increasing at transmission of the uplink response signal. Accordingly, the terminal 200 can transmit a larger number of bits or can improve error resistance.

Selection of the transmission band of the uplink response signal is not limited to the method of selecting clusters in the order of the widest bandwidth per cluster as illustrated in FIG. 11, but each cluster may be selected as the transmission band of the uplink response signal in, for example, the descending or ascending order of cluster transmission frequency. Accordingly, the base station 100 and the terminal 200 can determine the transmission band of the uplink response signal through simple processing while the CM and the PAPR of the uplink response signal are prevented from increasing.

<Determination Method 5>

In the determination method 5, similarly to the determination method 1, the transmission band of the uplink response signal in the self-contained operation is restricted to be within the transmission band of the downlink data.

In the determination method 5, the number of uplink response signal transmission symbols (also referred to as the number of OFDM symbols; in other words, a time resource amount) is changed in accordance with the transmission bandwidth of the uplink response signal (in other words, a frequency resource amount).

Specifically, the response signal resource control unit 111 of the base station 100 and the response signal resource control unit 208 of the terminal 200 set the number of uplink response signal transmission symbols (time resource) to be larger for a narrower transmission band of the uplink response signal (or downlink data).

Figure 12:
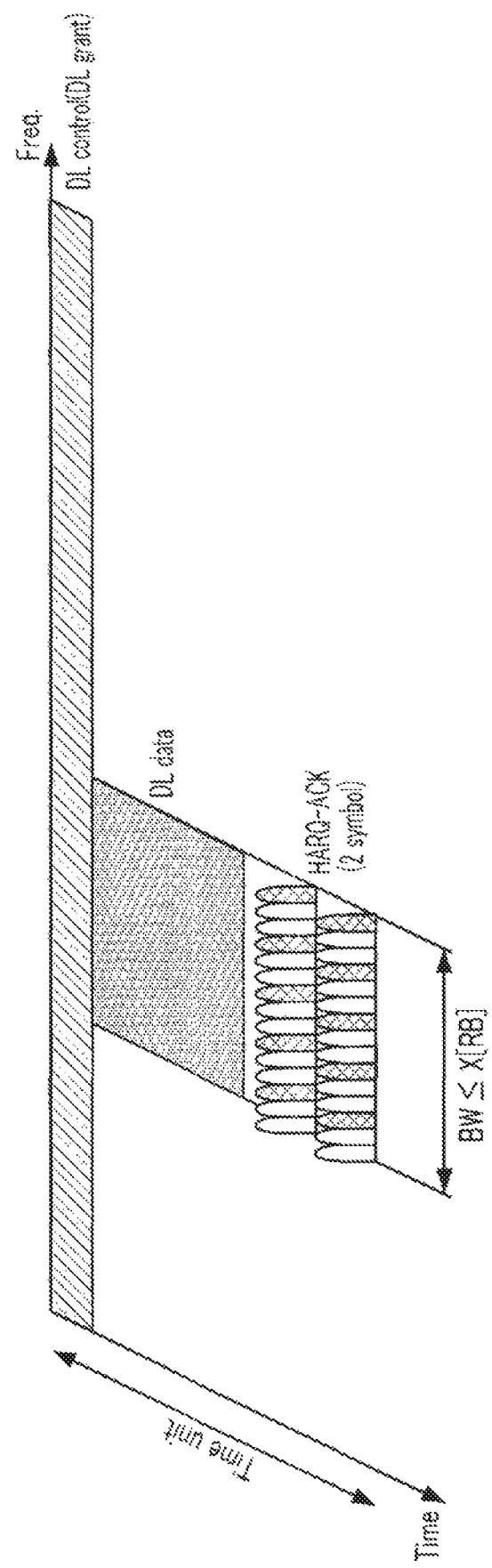
FIG. 12 is a diagram illustrating an exemplary HARQ operation in the self-contained time unit according to a determination method 5 of the embodiment.

FIG. 12 illustrates exemplary frequency resource assignment of the downlink data (DL data) and the uplink response signal (HARQ-ACK) according to the determination method 5.

The base station 100 (response signal resource control unit 111) and the terminal 200 (response signal resource control unit 208) determine the transmission band of the downlink data targeted to the terminal 200 to be the transmission band of the uplink response signal (HARQ-ACK). When a bandwidth BW of the transmission band is equal to or smaller than a predetermined value X [RB], the base station 100 and the terminal 200 increase the number of uplink response signal transmission symbols.

For example, as illustrated in FIG. 12, when the transmission bandwidth BW of the downlink data is equal to or smaller than the threshold X, the terminal 200 sets the number of uplink response signal transmission symbols to be two. When the transmission bandwidth BW of the downlink data is larger than the threshold X, the terminal 200 sets the number of uplink response signal transmission symbols to be one as illustrated in FIGS. 7 to 11.

When the transmission bandwidth of the uplink response signal is narrow (when BW≤X), the terminal 200 has difficulties in transmitting bits in a number necessary for the uplink response signal at a desired quality. However, in the determination method 5, when the transmission bandwidth of the downlink data is narrow (in other words, when the uplink response signal resource in the frequency direction is small), the terminal 200 can transmit a necessary number of bits at a desired quality by extending the uplink response signal resource in the time direction.

In this manner, in the determination method 5, degradation of the coverage performance of the uplink response signal can be prevented by changing the number of uplink response signal transmission symbols in accordance with the transmission bandwidth of the downlink data (in other words, the uplink response signal).

The embodiment of the present disclosure are described above.

Figure 13:
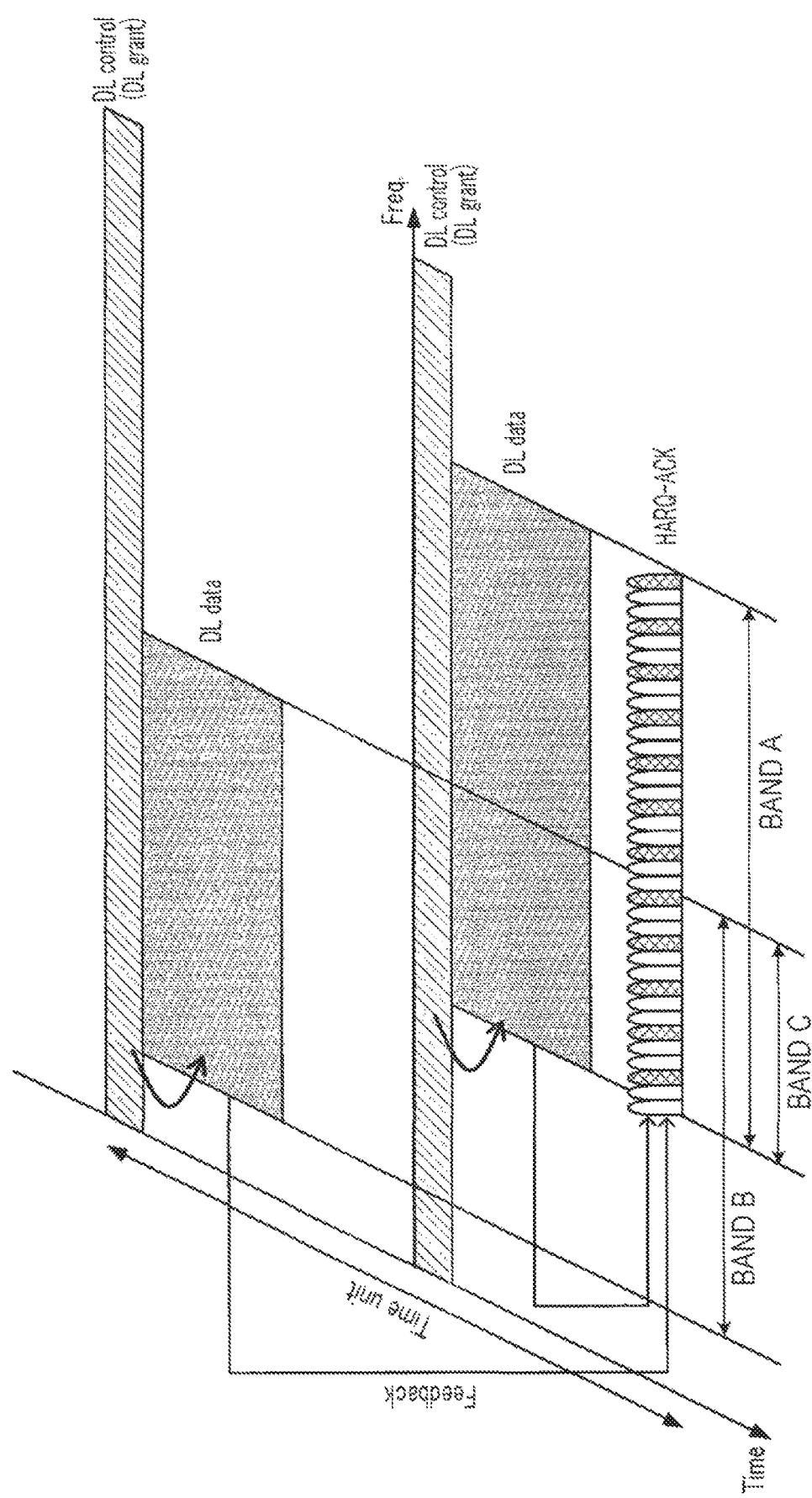
FIG. 13 is a diagram illustrating an exemplary HARQ operation in the self-contained time unit according to another embodiment.

Other Embodiments (1) As illustrated in FIG. 13, the base station 100 may transmit each of a plurality of pieces of the downlink data (DL data) assigned by the downlink control signal (DL grant) in a plurality of durations in the self-contained time unit. In this case, the transmission bands of the downlink data transmitted in the respective durations may be different from each other. The terminal 200 may transmit one response signal for the downlink data transmitted in the plurality of durations.

In this case, the base station 100 and the terminal 200 may restrict the transmission band of the uplink response signal to be within the transmission band of the downlink data temporally nearest to the feedback timing of the uplink response signal (in other words, the transmission band of the downlink data transmitted at the latest timing; band A illustrated in FIG. 13).

Alternatively, the base station 100 and the terminal 200 may restrict the transmission band of the uplink response signal to be within the transmission band of the downlink data temporally most separated from the feedback timing of the uplink response signal (in other words, the transmission band of the downlink data transmitted at the earliest timing; band B illustrated in FIG. 13).

Alternatively, the base station 100 and the terminal 200 may restrict the transmission band of the uplink response signal to be an overlapping band (in other words, a common region; band C illustrated in FIG. 13) between the transmission bands of the downlink data transmitted in the respective durations through each DL grant.

Effects same as those of the above-described embodiment can be obtained by sharing such rules of restriction related to the transmission band of the uplink response signal between the base station 100 and the terminal 200 in advance.

(2) An aspect of the present disclosure is applicable to the FDD system. In the FDD system, the base station 100 and the terminal 200 restrict an RB number (also referred to as PRB number) of the transmission band of the uplink response signal to be within an RB number (PRB number) of the transmission band of the downlink data.

Figure 14:
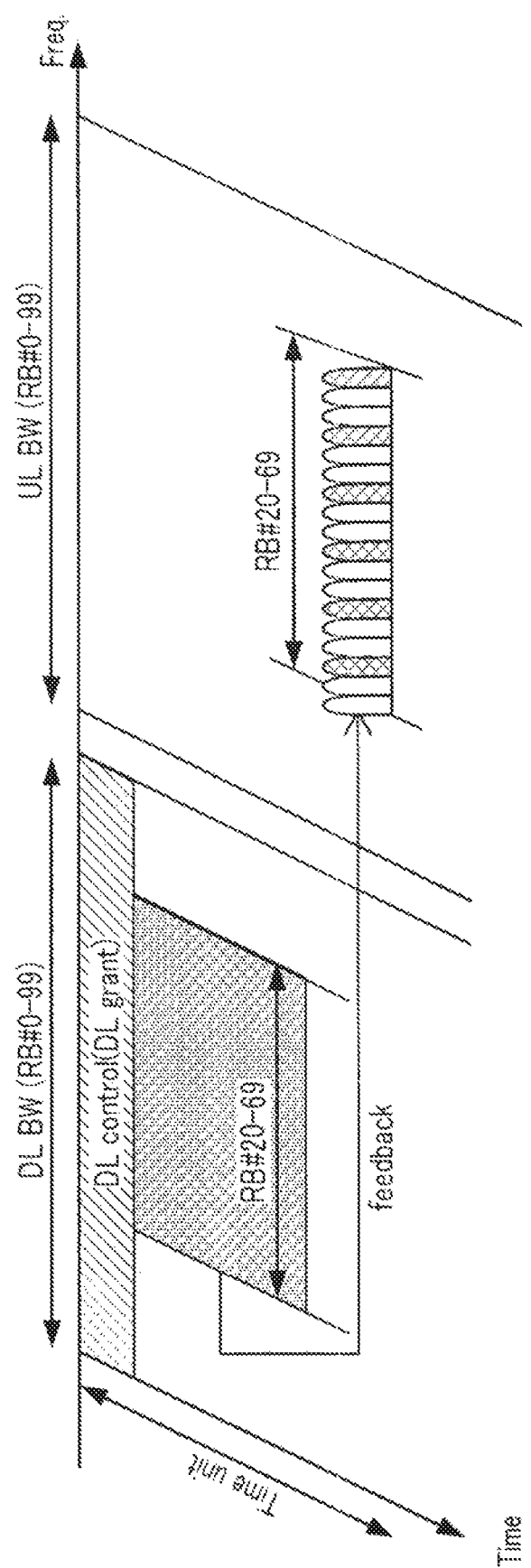
FIG. 14 is a diagram illustrating an exemplary HARQ operation in the self-contained time unit according to the other embodiment.

FIG. 14 illustrates an exemplary HARQ operation in the self-contained time unit in the FDD system. In the FDD system illustrated in FIG. 14, a downlink band (DL BW) and an uplink band (UL BW) include RB #0 to RB #99. In FIG. 14, the downlink data targeted to the terminal 200 is assigned to RB #20 to RB #69.

In this case, the base station 100 and the terminal 200 restricts the RB number of a frequency band used for transmission of the uplink response signal to each number identical to the RB number (RB #20 to RB #69) of a frequency band with which the downlink data is transmitted. In the example illustrated in FIG. 14, the RB numbers (RB #20 to RB #69) of the transmission band of the uplink response signal match with the RB numbers (RB #20 to RB #69) of the transmission band of the downlink data. Accordingly, similarly to each above-described embodiment (TDD system), in the FDD system, too, the transmission bandwidth of the uplink response signal is equal to or lower than the transmission bandwidth of the downlink data corresponding to the uplink response signal.

Accordingly, effects same as those of the above-described embodiment (TDD system) can be obtained in the FDD system, too.

In the FDD system, the transmission bandwidth of the uplink response signal does not necessarily need to match with the transmission bandwidth of the downlink data, but only needs to be equal to or lower than the transmission bandwidth of the downlink data. In the FDD system, the RB number of the transmission band of the uplink response signal does not necessarily need to be identical to the RB number of the transmission band of the downlink data.

(3) In the above-described embodiment, the radio resource of the uplink response signal is restricted to a radio resource used for transmission of the downlink data. However, an aspect of the present disclosure is not limited. For example, the radio resource of the uplink response signal transmitted in the self-contained time unit may be restricted to subbands multiplexed through frequency division for each usage in NR.

Figure 15:
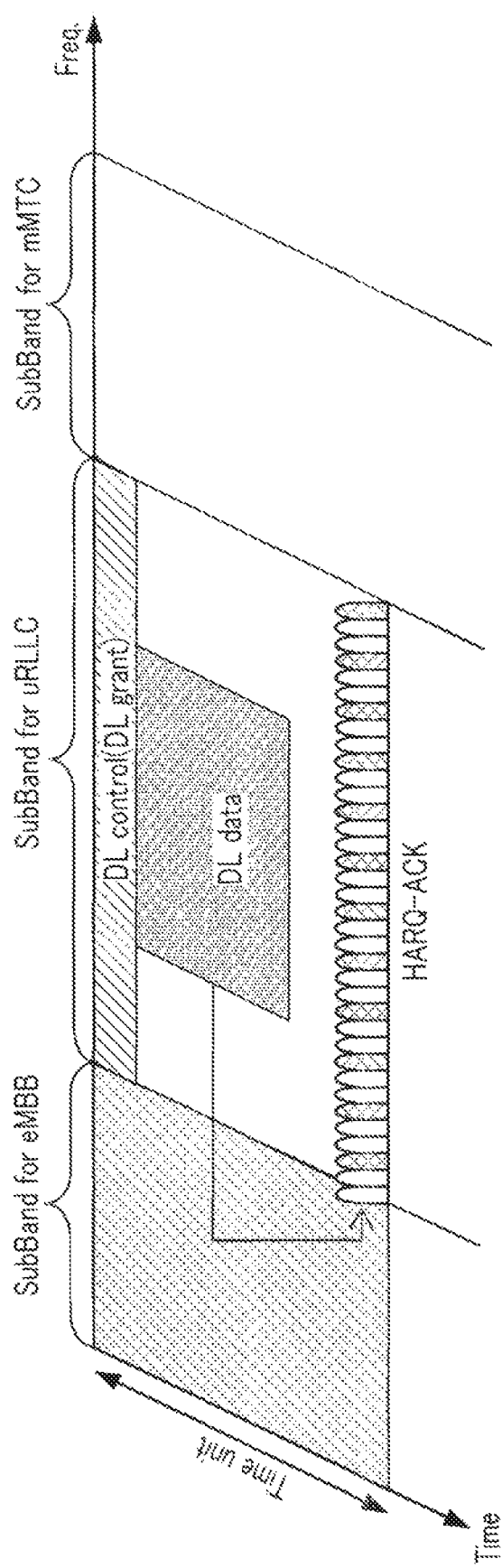
FIG. 15 is a diagram illustrating an exemplary HARQ operation in the self-contained time unit according to the other embodiment.

In NR, as illustrated in FIG. 15, a frequency band is divided into a plurality of subbands in accordance with a use case. Specifically, in FIG. 15, the subbands are divided for three use cases of enhanced mobile broadband (eMBB) in which large-volume communication is requested, ultra reliable low latency communication (uRLLC) in which less-delay communication is requested, and massive machine type communication (mMTC) in which transmission of a large number of small packets is requested.

The self-contained operation may be applied through an uRLLC subband for which less delay is requested. In this case, the base station 100 and the terminal 200 may restrict a frequency band in which the uplink response signal is transmitted in the self-contained operation to be within a frequency band defined as an uRLLC subband. Thus, the downlink data frequency band may be replaced with the uRLLC subband in the above description of the embodiment. Accordingly, the transmission band of the uplink response signal for uRLLC downlink data is restricted to the uRLLC subband, not to the entire system band. Thus, the base station 100 can reduce the number of terminals needed to be considered at orthogonal resource assignment of the uplink response signals to the number of terminals for uRLLC, thereby achieving easy scheduling (frequency resource assignment) of a downlink control signal (DL grant). Accordingly, effects same as those of the above-described embodiment can be obtained.

(4) Although each embodiment describes above an example in which an aspect of the present disclosure is configured by hardware, the present disclosure may be achieved by software in cooperation with hardware.

Each functional block used in the above description of the embodiments is typically achieved by an LSI as an integrated circuit. The integrated circuit may control each functional block used in the above description of the embodiments, and include an input and an output. The integrated circuits may be each individually provided as one chip, or may be partially or entirely provided as one chip. LSI is also called an IC, a system LSI, a super LSI, or an ultra LSI, depending on the density of integration.

Each integration circuit is not limited to an LSI, but may be achieved by a dedicated circuit or a general-purpose processor. Alternatively, the integration circuit may be achieved by a field programmable gate array (FPGA), which is programmable after manufacturing of an LSI, or a reconfigurable processor, which is connection and setting of circuit cells inside an LSI are reconfigurable.

Moreover, when an integration technology becomes available in place of LSI through the progress of the semiconductor technology or derivation of another technology, the functional block integration may be achieved by using this technology. For example, biotechnologies may be applied.

A base station of the present disclosure includes: a transmission unit configured to transmit a downlink control signal and downlink data assigned by the downlink control signal in a time unit including a downlink time resource for the downlink control signal, a downlink time resource for the downlink data, and an uplink time resource for a response signal for the downlink data; and a reception unit configured to receive the response signal in the time unit, in which a transmission bandwidth of the response signal is equal to or lower than a transmission bandwidth of the downlink data corresponding to the response signal.

In the base station of the present disclosure, the transmission band of the response signal is included in a transmission band of the downlink data corresponding to the response signal.

In the base station of the present disclosure, a radio resource used for transmission of the response signal is associated with a radio resource used for transmission of the downlink control signal including assignment information of the downlink data corresponding to the response signal.

In the base station of the present disclosure, a radio resource used for transmission of the response signal is associated with scheduling information for the terminal.

In the base station of the present disclosure, the number of clusters indicating the number of continuous bands is equal to or smaller than a predetermined threshold in the transmission band of the downlink data.

In the base station of the present disclosure, the number of clusters indicating the number of continuous bands is equal to or smaller than predetermined threshold in a transmission band of the response signal.

In the base station of the present disclosure, the transmission band of the response signal corresponds to clusters in a number equal to or smaller than the threshold that have a wider bandwidth per cluster among a plurality of clusters to which the downlink data is assigned.

In the base station of the present disclosure, a time resource used for transmission of the response signal is larger for a narrower transmission band of the response signal.

In the base station of the present disclosure, the transmission unit transmits the downlink data in each of a plurality of durations in the time unit, and the reception unit receives the response signal in a transmission band of the downlink data transmitted in a latest duration among the durations.

In the base station of the present disclosure, the transmission unit transmits the downlink data in each of a plurality of durations in the time unit, and the reception unit receives the response signal in a transmission band of the downlink data transmitted in an earliest duration among the durations.

In the base station of the present disclosure, the transmission unit transmits the downlink data in each of a plurality of durations in the time unit, and the reception unit receives the response signal in an overlapping band between transmission bands of the downlink data transmitted in the plurality of durations.

A terminal of the present disclosure includes: a reception unit configured to receive a downlink control signal and downlink data assigned by the downlink control signal in a time unit including a downlink time resource for the downlink control signal, a downlink time resource for the downlink data, and an uplink time resource for a response signal for the downlink data; and a transmission unit configured to transmit a response signal for the downlink data in the time unit, in which a transmission bandwidth of the response signal is equal to or lower than a transmission bandwidth of the downlink data corresponding to the response signal.

A communication method of the present disclosure includes: transmitting a downlink control signal and downlink data assigned by the downlink control signal in a time unit including a downlink time resource for the downlink control signal, a downlink time resource for the downlink data, and an uplink time resource for a response signal for the downlink data; and receiving the response signal in the time unit, in which a transmission bandwidth of the response signal is equal to or lower than a transmission bandwidth of the downlink data corresponding to the response signal.

A communication method of the present disclosure includes: receiving a downlink control signal and downlink data assigned by the downlink control signal in a time unit including a downlink time resource for the downlink control signal, a downlink time resource for the downlink data, and an uplink time resource for a response signal for the downlink data; and transmitting the response signal in the time unit, in which a transmission bandwidth of the response signal is equal to or lower than a transmission bandwidth of the downlink data corresponding to the response signal.

INDUSTRIAL APPLICABILITY

An aspect of the present disclosure is useful for a mobile communication system.

REFERENCE SIGNS LIST 100 base station
101 scheduling unit
102 control signal generation unit
103 control signal modulation unit
104 data encoding unit
105 retransmission control unit
106 data modulation unit
107, 211 signal assignment unit
108, 212 transmission unit
109, 201 antenna
110, 202 reception unit
111, 208 response signal resource control unit
112, 203 extraction unit
113 demodulation and decoding unit
114 determination unit
200 terminal
204 control signal decoding unit
205 data demodulation unit
206 data decoding unit
207 error detection unit
209 response signal generation unit
210 encoding and modulation unit

The invention claimed is:

1. A base station comprising:
a transmission circuit which, in operation, transmits a downlink control signal and downlink data assigned by the downlink control signal in a time unit including a downlink time resource for the downlink control signal, a downlink time resource for the downlink data, and an uplink time resource for a response signal for the downlink data; and
a reception circuit which, in operation, receives the response signal in the time unit,
wherein a transmission bandwidth of the response signal is equal to or lower than a transmission bandwidth of the downlink data corresponding to the response signal,
wherein a transmission band of the response signal is included in a transmission band of the downlink data corresponding to the response signal,
wherein a number of clusters indicating a number of continuous bands is equal to or smaller than a predetermined threshold in the transmission band of the response signal, and
wherein the transmission band of the response signal corresponds to clusters in a number equal to or smaller than the threshold that have a wider bandwidth per cluster among a plurality of clusters to which the downlink data is assigned.

2. The base station according to claim 1, wherein a radio resource used for transmission of the response signal is associated with a radio resource used for transmission of the downlink control signal including assignment information of the downlink data corresponding to the response signal.

3. The base station according to claim 1, wherein a radio resource used for transmission of the response signal is associated with scheduling information for a terminal.

4. The base station according to claim 1, wherein the number of clusters indicating the number of continuous bands is equal to or smaller than the predetermined threshold in the transmission band of the downlink data.

5. The base station according to claim 1, wherein a time resource used for transmission of the response signal is larger for a narrower transmission band of the response signal.

6. The base station according to claim 1, wherein
the transmission circuit transmits the downlink data in each of a plurality of durations in the time unit, and
the reception circuit receives the response signal in a transmission band of the downlink data transmitted in a latest duration among the durations.

7. The base station according to claim 1, wherein
the transmission circuit transmits the downlink data in each of a plurality of durations in the time unit, and
the reception circuit receives the response signal in a transmission band of the downlink data transmitted in an earliest duration among the durations.

8. The base station according to claim 1, wherein
the transmission circuit transmits the downlink data in each of a plurality of durations in the time unit, and
the reception circuit receives the response signal in an overlapping band between transmission bands of the downlink data transmitted in the plurality of durations.

9. A terminal comprising:
a reception circuit which, in operation, receives a downlink control signal and downlink data assigned by the downlink control signal in a time unit including a downlink time resource for the downlink control signal, a downlink time resource for the downlink data, and an uplink time resource for a response signal for the downlink data; and
a transmission circuit which, in operation, transmits a response signal for the downlink data in the time unit,
wherein a transmission bandwidth of the response signal is equal to or lower than a transmission bandwidth of the downlink data corresponding to the response signal,
wherein a transmission band of the response signal is included in a transmission band of the downlink data corresponding to the response signal,
wherein a number of clusters indicating a number of continuous bands is equal to or smaller than a predetermined threshold in the transmission band of the response signal, and
wherein the transmission band of the response signal corresponds to clusters in a number equal to or smaller than the threshold that have a wider bandwidth per cluster among a plurality of clusters to which the downlink data is assigned.

10. A communication method comprising:
transmitting a downlink control signal and downlink data assigned by the downlink control signal in a time unit including a downlink time resource for the downlink control signal, a downlink time resource for the downlink data, and an uplink time resource for a response signal for the downlink data; and receiving the response signal in the time unit, wherein a transmission bandwidth of the response signal is equal to or lower than a transmission bandwidth of the downlink data corresponding to the response signal, wherein a transmission band of the response signal is included in a transmission band of the downlink data corresponding to the response signal, wherein a number of clusters indicating a number of continuous bands is equal to or smaller than a predetermined threshold in the transmission band of the response signal, and wherein the transmission band of the response signal corresponds to clusters in a number equal to or smaller than the threshold that have a wider bandwidth per cluster among a plurality of clusters to which the downlink data is assigned.

11. A communication method comprising:

receiving a downlink control signal and downlink data assigned by the downlink control signal in a time unit including a downlink time resource for the downlink control signal, a downlink time resource for the downlink data, and an uplink time resource for a response signal for the downlink data; and transmitting the response signal in the time unit, wherein a transmission bandwidth of the response signal is equal to or lower than a transmission bandwidth of the downlink data corresponding to the response signal, wherein a transmission band of the response signal is included in a transmission band of the downlink data corresponding to the response signal, wherein a number of clusters indicating a number of continuous bands is equal to or smaller than a predetermined threshold in the transmission band of the response signal, and wherein the transmission band of the response signal corresponds to clusters in a number equal to or smaller than the threshold that have a wider bandwidth per cluster among a plurality of clusters to which the downlink data is assigned.

* * * * *